US012327058B2

(12) United States Patent
Jin et al.

(10) Patent No.: US 12,327,058 B2
(45) Date of Patent: Jun. 10, 2025

(54) DISPLAY METHOD AND APPARATUS

(71) Applicant: HUAWEI TECHNOLOGIES CO., LTD., Guangdong (CN)

(72) Inventors: Qinghao Jin, Dongguan (CN); Hung-yi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 17/891,724

(22) Filed: Aug. 19, 2022

(65) Prior Publication Data

US 2022/0391159 A1 Dec. 8, 2022

Related U.S. Application Data

(63) Continuation of application No. 17/267,593, filed as application No. PCT/CN2018/100687 on Aug. 15, 2018, now abandoned.

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1641* (2013.01); *G06F 1/1652* (2013.01);
(Continued)

(58) Field of Classification Search
CPC .... G06F 1/1677; G06F 3/1423; G06F 1/1641; G06F 40/30; G06F 3/013; G06F 1/1652
See application file for complete search history.

(56) References Cited

U.S. PATENT DOCUMENTS

2010/0302179 A1  12/2010  Ahn et al.
2015/0220299 A1   8/2015  Kim
(Continued)

FOREIGN PATENT DOCUMENTS

CN   101788850 A   7/2010
CN   107103840 A   8/2017
(Continued)

OTHER PUBLICATIONS

Chinese Office Action issued in Chinese Application No. 201880094451.2 dated Apr. 2, 2022 (10 pages).
(Continued)

*Primary Examiner* — Andrea C Leggett
(74) *Attorney, Agent, or Firm* — Fish & Richardson P.C.

(57) ABSTRACT

At least two display areas are formed after an action such as folding a foldable screen of a device. The device displays a first display interface comprising a display interface of a first application. The device detects a first operation such as unfolding the screen and in response, displays a second display interface comprising a first display area and a second display area. The device displays the display interface of the first application in the first display area of the second display interface, and displays at least one application icon in the second display area of the second display interface. The device detects a second operation acting on an application icon corresponding to the first target application and in response, displays a third display interface that comprises the first display area and the second display area.

16 Claims, 18 Drawing Sheets

(51) Int. Cl.
  *G06F 3/01* (2006.01)
  *G06F 3/04886* (2022.01)
  *G06F 40/30* (2020.01)
(52) U.S. Cl.
  CPC ............ *G06F 1/1677* (2013.01); *G06F 3/013* (2013.01); *G06F 3/04886* (2013.01); *G06F 40/30* (2020.01); *G06F 2203/04803* (2013.01)

(56) References Cited

U.S. PATENT DOCUMENTS

| | | | |
|---|---|---|---|
| 2015/0325216 A1 | 11/2015 | Park et al. | |
| 2015/0370455 A1 | 12/2015 | Van Os et al. | |
| 2018/0081398 A1 | 3/2018 | Shin et al. | |
| 2018/0081517 A1 | 3/2018 | Luo et al. | |
| 2018/0217725 A1 | 8/2018 | Wygonik | |
| 2020/0249898 A1* | 8/2020 | Ko | G06F 3/04886 |
| 2020/0264826 A1* | 8/2020 | Kwon | G06F 21/629 |
| 2020/0310492 A1* | 10/2020 | Kim | H04M 1/0245 |
| 2021/0105389 A1* | 4/2021 | Ko | G06F 3/04845 |

FOREIGN PATENT DOCUMENTS

| | | | |
|---|---|---|---|
| CN | 107209653 | A | 9/2017 |
| CN | 107678661 | A | 2/2018 |
| CN | 107704177 | A | 2/2018 |
| CN | 107728901 | A | 2/2018 |
| CN | 107783808 | A | 3/2018 |
| CN | 107800878 | A | 3/2018 |
| CN | 107809504 | A | 3/2018 |
| CN | 107846501 | A | 3/2018 |
| CN | 108052302 | A | 5/2018 |
| CN | 108196922 | A | 6/2018 |
| CN | 108304138 | A | 7/2018 |
| CN | 108319436 | A | 7/2018 |
| WO | 2012044782 | A1 | 4/2012 |
| WO | 2017200582 | A1 | 11/2017 |
| WO | 2018034555 | A1 | 2/2018 |
| WO | 2018036278 | A1 | 3/2018 |

OTHER PUBLICATIONS

Extended European Search Report issued in EP 18930382.9, dated Jun. 21, 2021, total 8 pages.
International Search Report and Written Opinion issued in PCT/CN2018/100687 dated May 15, 2019, total 10 pages.
JuHyun Lee et al., Regeneration of the Traditional Folding Screen as Media Art, 2009 13th International Conference Information Visualisation, Jul. 15-17, 2009, 6 pages.
Deng Cheng, Energy saving technology based on dual display mobile terminal from the patent, Communication Enterprise Management, C-Enterprise Management, Editorial Office, Feb. 2016, with an English abstract total 3 pages.
European Oral Proceedings issued in European Application No. 18 930 382.9 dated Jun. 8, 2023.

* cited by examiner

DISPLAY METHOD AND APPARATUS

CROSS-REFERENCE TO RELATED APPLICATIONS

This application is a continuation of U.S. patent application Ser. No. 17/267,593, filed on Feb. 10, 2021, now abandoned, which is a national stage of International Application No. PCT/CN2018/100687, filed on Aug. 15, 2018. Both of the aforementioned applications are hereby incorporated by reference in their entireties.

TECHNICAL FIELD

This application relates to the field of terminal technologies, and in particular, to a display method and apparatus.

BACKGROUND

With continuous development of terminal technologies, increasingly more manufacturers have begun to produce electronic devices with foldable screens, such as mobile phones, tablets, and laptops. Emergence of the foldable screen allows a user to select, when using an electronic device, display of different applications in different display areas obtained after the foldable screen is folded, or to unfold the folded foldable screen to combine folded display areas to display an application together, thereby expanding a display area of the foldable screen.

However, in certain prior art, after detecting that the user unfolds the foldable screen from a folded state, the electronic device only mechanically displays to-be-displayed content on the full screen, or only after the user needs to select applications that the user expects to open, the electronic device displays, in different display interfaces in unfolded display areas, the applications selected by the user. Therefore, even if the foldable screen of the electronic device that uses the prior art is unfolded, a step of selecting an application by the user is still required. Consequently, a method process in which the existing electronic device with the foldable screen performs display in a plurality of display areas is relatively complex and lacks intelligence.

Based on these and other considerations, further improvements relating to improving user interfaces are desirable.

SUMMARY

This application provides a display method and apparatus. In one example, a device displays a first display interface comprising a display interface of a first application; detects a first operation; displays a second display interface comprising a first display area and a second display area, wherein displaying the display interface of the first application in the first display area of the second display interface, and displays at least one application icon in the second display area of the second display interface, wherein at least one application corresponding to the at least one application icon is associated with a first content in the display interface of the first application, and the at least one application comprises a first target application; detects a second operation acting on an application icon corresponding to the first target application; and displays a third display interface that comprises the first display area and the second display area, wherein displaying the display interface of the first application in the first display area of the third display interface, and displaying, in the second display area of the third display interface, a first interface of the first target application, the first interface is associated with the first content.

When a folded screen of an electronic device with a foldable screen is unfolded, a first target application can be determined based on content displayed in a first display area, and the first target application can be displayed in an unfolded second display area, so that after unfolding the foldable screen, a user does not need to manually select an application, but directly displays, in the second display area or a third display area, an application that the user expects to open. This reduces complexity of a display method of the electronic device to which the foldable screen is applied, improves intelligence of the electronic device, and further improves user experience of unfolding the foldable screen and displaying an application by the user.

According to an embodiment of a first aspect, this application provides a display method, where the method is applied to an electronic device with a foldable screen, at least two display areas are formed after the foldable screen is folded, and the method includes:
  detecting a folding angle between a first display area and a second display area;
  when the folding angle is greater than a preset threshold, determining a first target application based on content displayed in the first display area; and
  displaying the first target application in the second display area.

In an embodiment of the first aspect of this application, after the determining a first target application based on content displayed in the first display area, the method includes:
  displaying the first target program in a third display area obtained by combining the first display area and the second display area.

In an embodiment of the first aspect of this application, the determining a first target application based on content displayed in the first display area includes:
  determining a location, of a focus of sight of a user of the electronic device, in the first display area; and
  determining the first target application based on content displayed at the location of the focus of sight.

In an embodiment of the first aspect of this application, the determining a first target application based on content displayed in the first display area includes:
  determining semantic information of a text in the content displayed in the first display area; and
  determining that an application corresponding to the semantic information is the first target application.

In an embodiment of the first aspect of this application, the displaying the first target application in the second display area includes:
  displaying, in the second display area, N optional applications related to the first target application, where N≥2;
  obtaining a tapping action in the second display area, and determining that an optional application corresponding to a location of the tapping action is the first target application; and
  displaying the first target application in the second display area.

In an embodiment of the first aspect of this application, after the displaying the first target application in the second display area, the method further includes:
  obtaining a tapping action in a display interface of the first display area;
  determining a second target application based on content displayed at a location of the tapping action; and displaying the second target application in the second display area.

In an embodiment of the first aspect of this application, after the displaying the first target program in a third display area obtained by combining the first display area and the second display area, the method further includes:

displaying M optional applications in a specific area in the third display area, where M≥1, and the optional applications are related to the first target application, or the optional applications correspond to semantic information of a text in the content displayed in the first display area;

obtaining a tapping action in the third display area, and determining that an optional application corresponding to a location of the tapping action is a third target application; and displaying the third target application in the third display area.

In an embodiment of the first aspect of this application, before the detecting a folding angle between a first display area and a second display area, the method further includes:

obtaining a message prompt that is of the first target application and that is displayed in the first display area; and the determining a first target application based on content displayed in the first display area includes: determining the first target application based on the prompt message.

In conclusion, in the display method provided in an embodiment of the first aspect of this application, the folding angle between the first display area and the second display area is detected. When the folding angle is greater than the preset threshold, the first target application is determined based on the content displayed in the first display area. The first target application is displayed in the second display area. Therefore, when the screen of the electronic device with the foldable screen is unfolded, the first target application can be determined based on the content displayed in the first display area, and the first target application can be displayed in the unfolded second display area or third display area, so that after unfolding the foldable screen, the user does not need to manually select an application, but directly displays, in the second display area or the third display area, an application that the user expects to open. This reduces complexity of a display method of the electronic device to which the foldable screen is applied, improves intelligence of the electronic device, and further improves user experience of unfolding the foldable screen and displaying an application by the user.

According to a second aspect, this application provides a display apparatus, where the display apparatus has a foldable screen, at least two display areas are formed after the foldable screen is folded, and the display apparatus includes:

a detection module, configured to detect a folding angle between a first display area and a second display area;

a processing module, configured to: when the folding angle is greater than a preset threshold, determine a first target application based on content displayed in the first display area; and a display module, configured to display the first target application in the second display area.

In an embodiment of the second aspect of this application, the display module is configured to:

display the first target program in a third display area obtained by combining the first display area and the second display area.

In an embodiment of the second aspect of this application, the display apparatus further includes:

a recognition module, configured to determine a location, of a focus of sight of a user of the electronic device, in the first display area; and the processing module is specifically configured to determine the first target application based on content displayed at the location of the focus.

In an embodiment of the second aspect of this application, the processing module is specifically configured to:

determine semantic information of a text in the content displayed in the first display area; and determine that an application corresponding to the semantic information is the first target application.

In an embodiment of the second aspect of this application, the display module is further configured to display, in the second display area, N optional applications related to the first target application, where N≥2; and the processing module is further configured to: obtain a tapping action in the second display area, and determine that an optional application corresponding to a location of the tapping action is the first target application.

In an embodiment of the second aspect of this application, the processing module is further configured to:

obtain a tapping action in a display interface of the first display area; and determine a second target application based on content displayed at a location of the tapping action; and the display module is further configured to display the second target application in the second display area.

In an embodiment of the second aspect of this application, the display module is further configured to:

display M optional applications in a specific area in the third display area, where M≥1, and the optional applications are related to the first target application, or the optional applications correspond to semantic information of a text in the content displayed in the first display area; and the processing module is further configured to: obtain a tapping action in the third display area, and determine that an optional application corresponding to a location of the tapping action is a third target application.

In an embodiment of the second aspect of this application, the processing module is further configured to:

obtain a message prompt that is of the first target application and that is displayed in the first display area; and determine the first target application based on the prompt message.

In conclusion, according to the display apparatus provided in the second aspect of this application, the detection module detects the folding angle between the first display area and the second display area. When the folding angle is greater than the preset threshold, the processing module determines the first target application based on the content displayed in the first display area. The display module displays the first target application in the second display area. Therefore, when the screen of the electronic device with the foldable screen is unfolded, the first target application can be determined based on the content displayed in the first display area, and the first target application can be displayed in the unfolded second display area or third display area, so that after unfolding the foldable screen, the user does not need to manually select an application, but directly displays, in the second display area or the third display area, an application that the user expects to open. This reduces complexity of a display method of the electronic device to which the foldable screen is applied, improves intelligence of the electronic device, and further improves user experience of unfolding the foldable screen and displaying an application by the user.

According to a third aspect, this application provides an electronic device, where the electronic device has a foldable screen, at least two display areas are formed after the foldable screen is folded, and the electronic device includes:

a detector, configured to detect a folding angle between a first display area and a second display area;

a processor, configured to: when the folding angle is greater than a preset threshold, determine a first target application based on content displayed in the first display area; and a display, configured to display the first target application in the second display area.

In an embodiment of the third aspect of this application, the display is configured to:

display the first target program in a third display area obtained by combining the first display area and the second display area.

In an embodiment of the third aspect of this application, the electronic device further includes:

a recognizer, configured to determine a location, of a focus of sight of a user of the electronic device, in the first display are; and the processor is specifically configured to determine the first target application based on content displayed at the location of the focus.

In an embodiment of the third aspect of this application, the processor is specifically configured to:

determine semantic information of a text in the content displayed in the first display area; and determine that an application corresponding to the semantic information is the first target application.

In an embodiment of the third aspect of this application, the display is further configured to display, in the second display area, N optional applications related to the first target application, where N≥2; and the processor is further configured to: obtain a tapping action in the second display area, and determine that an optional application corresponding to a location of the tapping action is the first target application.

In an embodiment of the third aspect of this application, the processor is further configured to:

obtain a tapping action in a display interface of the first display area; and determine a second target application based on content displayed at a location of the tapping action; and the display is further configured to display the second target application in the second display area.

In an embodiment of the third aspect of this application, the display is further configured to:

display M optional applications in a specific area in the third display area, where M≥1, and the optional applications are related to the first target application, or the optional applications correspond to semantic information of a text in the content displayed in the first display area; and the processor is further configured to: obtain a tapping action in the third display area, and determine that an optional application corresponding to a location of the tapping action is a third target application.

In an embodiment of the third aspect of this application, the processor is further configured to:

obtain a message prompt that is of the first target application and that is displayed in the first display area; and determine the first target application based on the prompt message.

In conclusion, according to the electronic device provided in the third aspect of this application, the detector detects the folding angle between the first display area and the second display area. When the folding angle is greater than the preset threshold, the processor determines the first target application based on the content displayed in the first display area. The display displays the first target application in the second display area. Therefore, when the screen of the electronic device with the foldable screen is unfolded, the first target application can be determined based on the content displayed in the first display area, and the first target application can be displayed in the unfolded second display area or third display area, so that after unfolding the foldable screen, the user does not need to manually select an application, but directly displays, in the second display area or the third display area, an application that the user expects to open. This reduces complexity of a display method of the electronic device to which the foldable screen is applied, improves intelligence of the electronic device, and further improves user experience of unfolding the foldable screen and displaying an application by the user.

A fourth aspect of this application provides an electronic device, including a processor and a memory, where the memory is configured to store a program, and the processor is configured to invoke the program stored in the memory to execute the method according to any one of the first aspect of this application.

A fifth aspect of this application provides a computer-readable storage medium, where the computer-readable storage medium stores program code, and when the program code is executed, the method according to any one of the first aspect of this application is performed.

DESCRIPTION OF EMBODIMENTS

Figure 1:
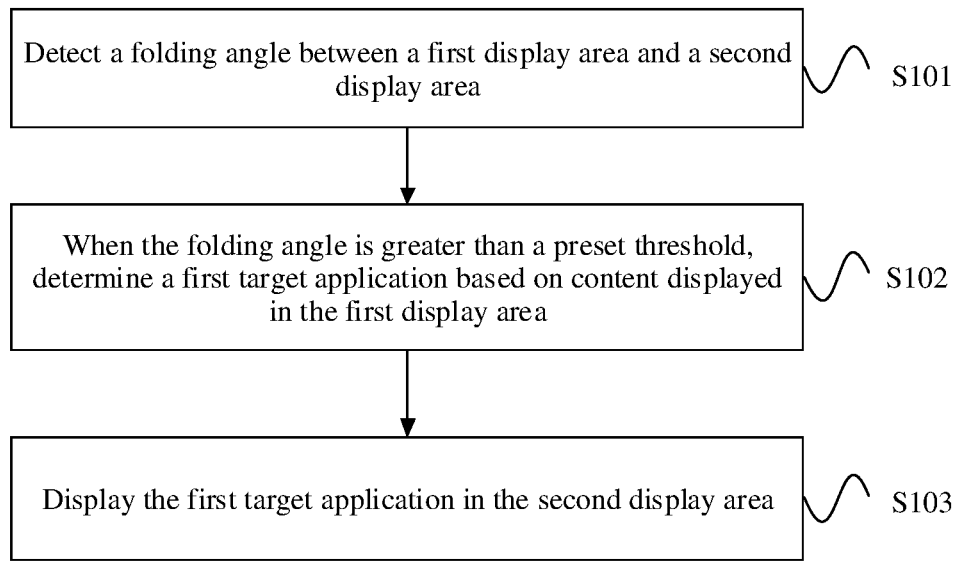
FIG. 1 is a schematic flowchart of an embodiment of a display method according to this application.

FIG. 1 is a schematic flowchart of an embodiment of a display method according to this application. As shown in FIG. 1, the display method provided in this embodiment includes the following steps:

S101. Detect a folding angle between a first display area and a second display area.

S102. When the folding angle is greater than a preset threshold, determine a first target application based on content displayed in the first display area.

S103. Display the first target application in the second display area.

This embodiment is performed by an electronic device with a foldable screen. After the foldable screen is folded, at least two display areas can be formed, and each display area may be used to display different content. Alternatively, after the foldable screen is unfolded, the at least two display areas may be combined as a whole for display. Optionally, the foldable screen in this embodiment is a flexible organic light-emitting diode (Organic Light-Emitting Diode, OLED) screen. After the OLED screen is folded, a display area of the OLED screen can be divided into a first display area and a second display area on two sides of a folding line based on the folding line along which the OLED screen is folded. Similarly, after the folded flexible OLED screen is unfolded, the first display area and the second display area are combined into the original flexible OLED screen.

Figure 2:
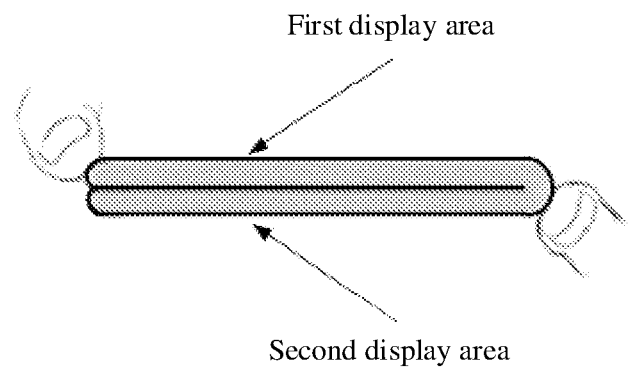
FIG. 2 is a schematic structural diagram of a side face of an electronic device to which a display method according to this application is applied.
Figure 3:
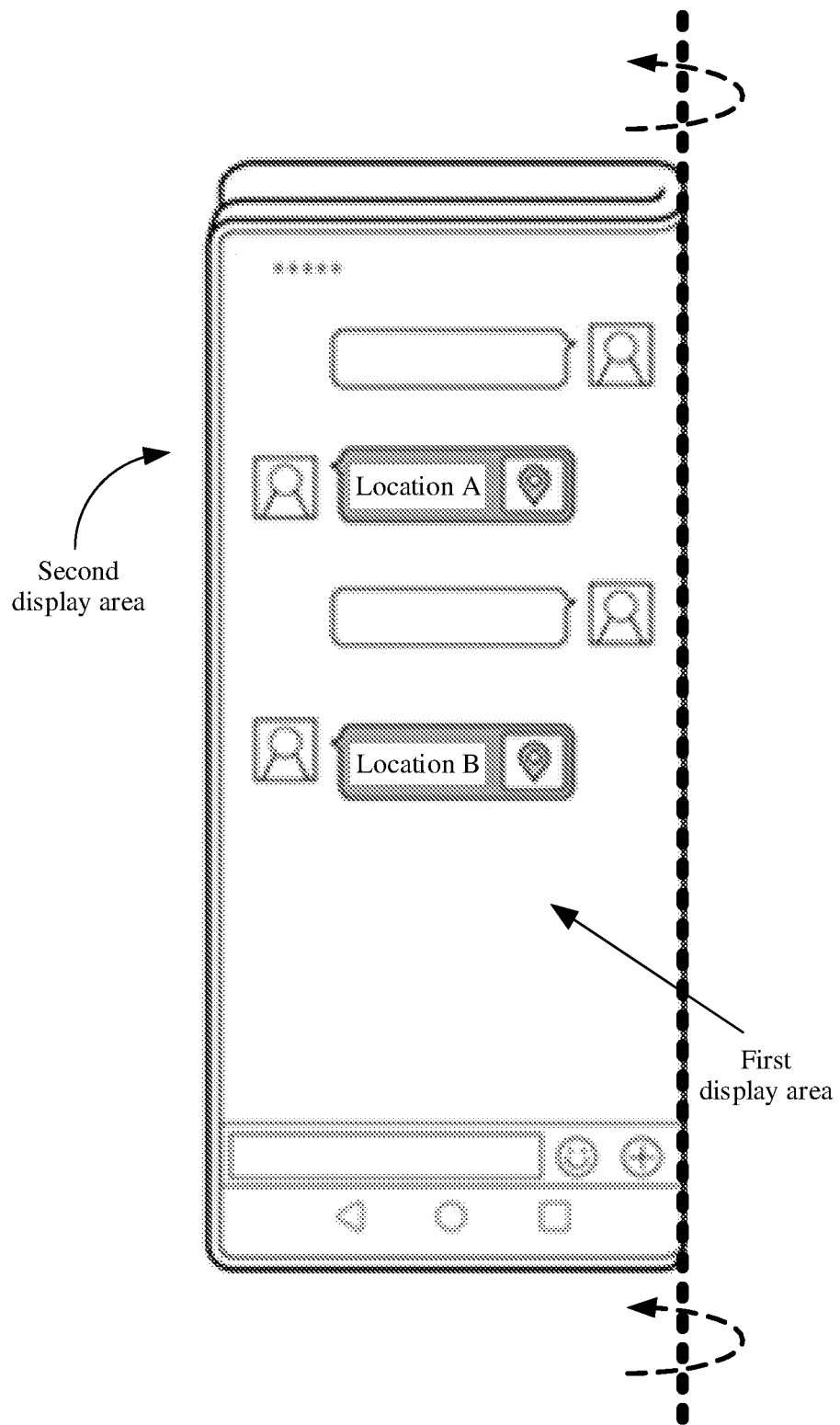
FIG. 3 is a schematic structural diagram of a front face of an electronic device to which a display method according to this application is applied.

For example, an electronic device shown in FIG. 2 and FIG. 3 is an example of a structure to which a flexible OLED screen is applied. FIG. 2 is a schematic structural diagram of a side face of an electronic device to which a display method according to this application is applied. FIG. 3 is a schematic structural diagram of a front face of an electronic device to which a display method according to this application is applied. The flexible OLED screen of the electronic device shown in FIG. 2 and FIG. 3 is currently in a folded state, and the flexible OLED screen covers an outer surface of the electronic device. After the foldable screen of the electronic device is rotated and folded based on an axis indicated by a vertical dashed line in the figure, one foldable screen is divided into a first display area and a second display area, and the first display area and the second display area are on two sides of the electronic device for respective display. Usually, when using an electronic device in a folded state, a user usually views content only on one side. For example, the first display area is used as an example in the figure. When the user views content by using the first display area, no content is currently displayed in the second display area, which is folded beneath the device as shown in FIG. 2.

Figure 4:
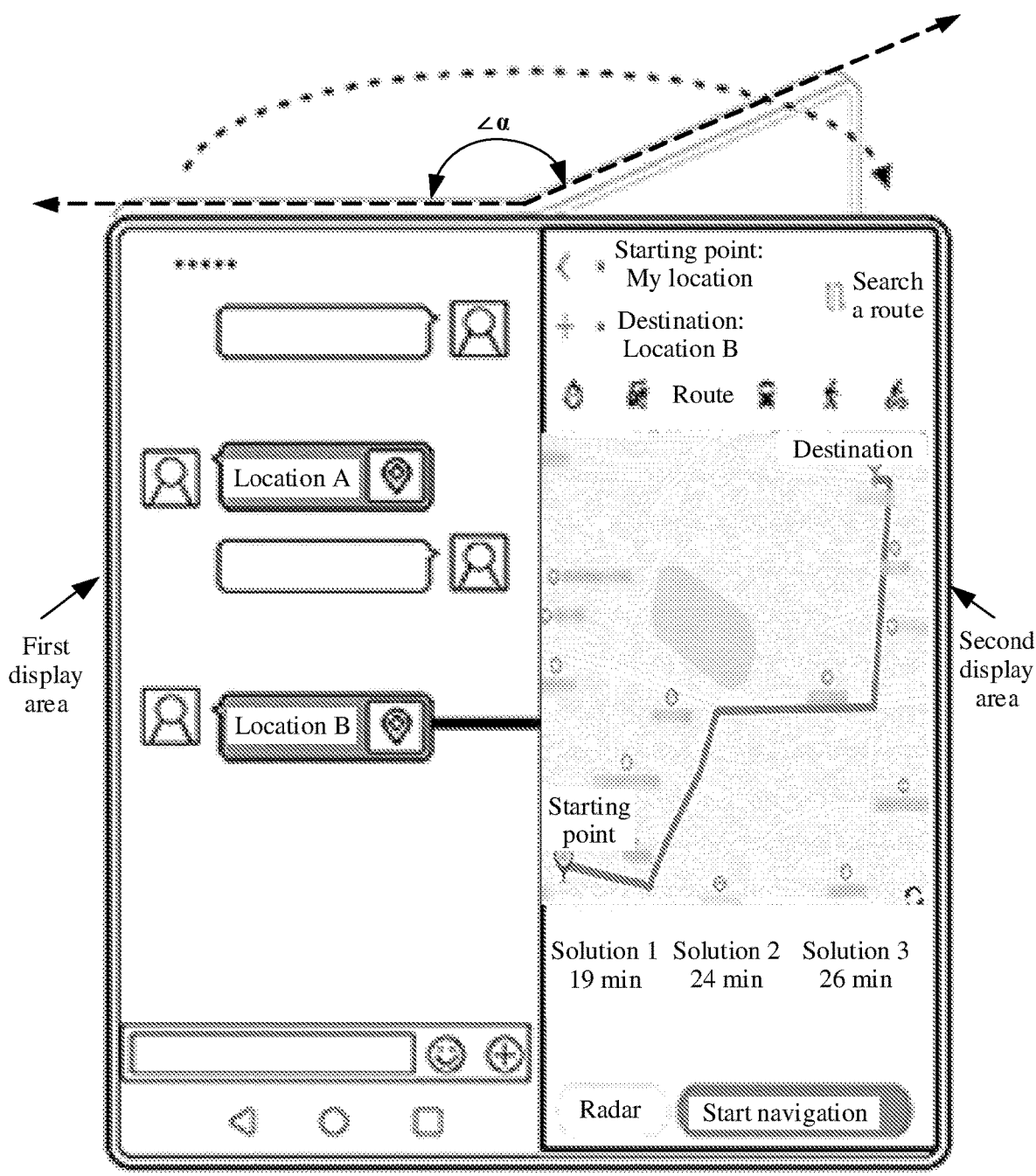
FIG. 4 is a schematic structural diagram existing when an embodiment of a display method according to this application is applied to an electronic device.

Specifically, the display method provided in this embodiment is used to determine and select, after the screen of the electronic device with the foldable screen is unfolded, an application to be displayed in the second display area. For example, FIG. 4 is a schematic structural diagram if a display scenario existing when an embodiment of a display method according to this application is applied to an electronic device. After the foldable screen of the electronic device shown in FIG. 3 is rotated in a reverse direction based on the folding line and a folding direction of the screen, and the first display area and the second display area are unfolded, the schematic structural diagram of the foldable screen shown in FIG. 4 is obtained. An angle between the first display area and the second display area of the foldable screen is La shown in the figure. In this case, in the foregoing step S101, the electronic device monitors in real time whether the foldable screen in the folded state is unfolded, and detects whether the folding angle La between the first display area and the second display area is greater than the preset threshold. For example, if the folding angle changes from 0 degrees to more than 90 degrees based on use experience of the electronic device, it may be understood that the user is to unfold (e.g., is in the process of unfolding) the foldable screen. In this case, the preset threshold of the folding angle may be set to 90 degrees, and when the folding angle between the first display area and the second display area of the foldable screen starts to change from 0 degrees, it is detected whether the folding angle between the first display area and the second display area is or becomes greater than the preset 90 degrees.

If detecting that the folding angle La is greater than the preset threshold in S101, the electronic device determines or selects, in S102, the first target application based on the content displayed in the first display area, and displays, in the second display area in S103, the first target application determined in S102. In addition, the content displayed in the first display area does not change, and the first display area and the second display area are independent of each other and do not interfere with each other. For example, in the embodiment shown in FIG. 4, the content displayed in the first display area both before unfolding (FIG. 3) and after unfolding (FIG. 4) is dialog data obtained when the user makes a dialog in a communications application, and a location B is mentioned in newest dialog data. In this case, the electronic device determines, based on the content "the location B" displayed in the first display area, that a corresponding application that the user expects to open by unfolding the foldable screen is a map application, that is, the electronic device determines that the user expects to view in a map, a specific address of the location B which the user inputted into an input field in the application displayed in the first display area. Therefore, the electronic device determines and selects that the map application is the first target application, and displays the map application in the second display area. Furthermore, as shown in FIG. 4, the electronic device optionally provides "Location B" input to the map application displayed in the second display area so the map application plots "Location B" (see below description).

It should be noted that in the accompanying drawings of the embodiments of this application, display of specific display interfaces of different applications such as the communications application and the map application is merely an example, and is not intended to limit actual content displayed by applying the display method in this application. For details that are of the applications and that are not shown in the accompanying drawings of the embodiments, refer to a display interface of an application in the prior art.

Optionally, in S103, in addition to simply displaying the first target application in the second display area, the electronic device may further process, in the first target application, the content displayed in the first display area. For example, in the embodiment shown in FIG. 4, in addition to simply displaying the map application, the electronic device further searches for detailed location information of the location B in the map application based on the content "the location B" displayed in the first display area, and may further search for, based on the location B, a distance between a location of the electronic device and the location B and a time period required to get from the location of the electronic device to the location B, and display a taxi price.

Figure 5:
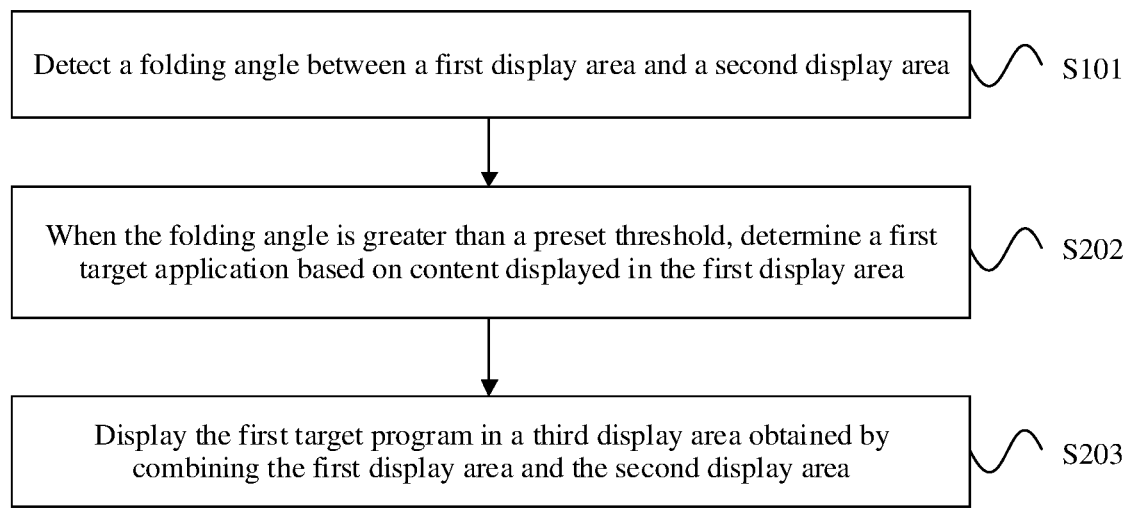
FIG. 5 is a schematic flowchart of an embodiment of a display method according to this application.

FIG. 5 is a schematic flowchart of an embodiment of a display method according to this application. The display method provided in the embodiment shown in FIG. 5 includes the following steps:

S201. Detect a folding angle between a first display area and a second display area.

S202. When the folding angle is greater than a preset threshold, determine a first target application based on content displayed in the first display area.

S203. Display the first target application in the second display area.

Steps S201 and S202 in the display method provided in this embodiment are the same as S101 and S102 in the display method shown in FIG. 1, and details are not described again. Different from S103 of displaying the first target application in the second display area in FIG. 1, in S203 in this embodiment, an electronic device displays, in the third display area, the first target application determined in S202. The third display area is a display area obtained by combining the first display area and the second display area. For a flexible OLED display screen, the third display area in one embodiment herein is an entire display area existing before the entire display screen is folded, and the first display area and the second display area are obtained only after the third display area is folded.

Figure 6:
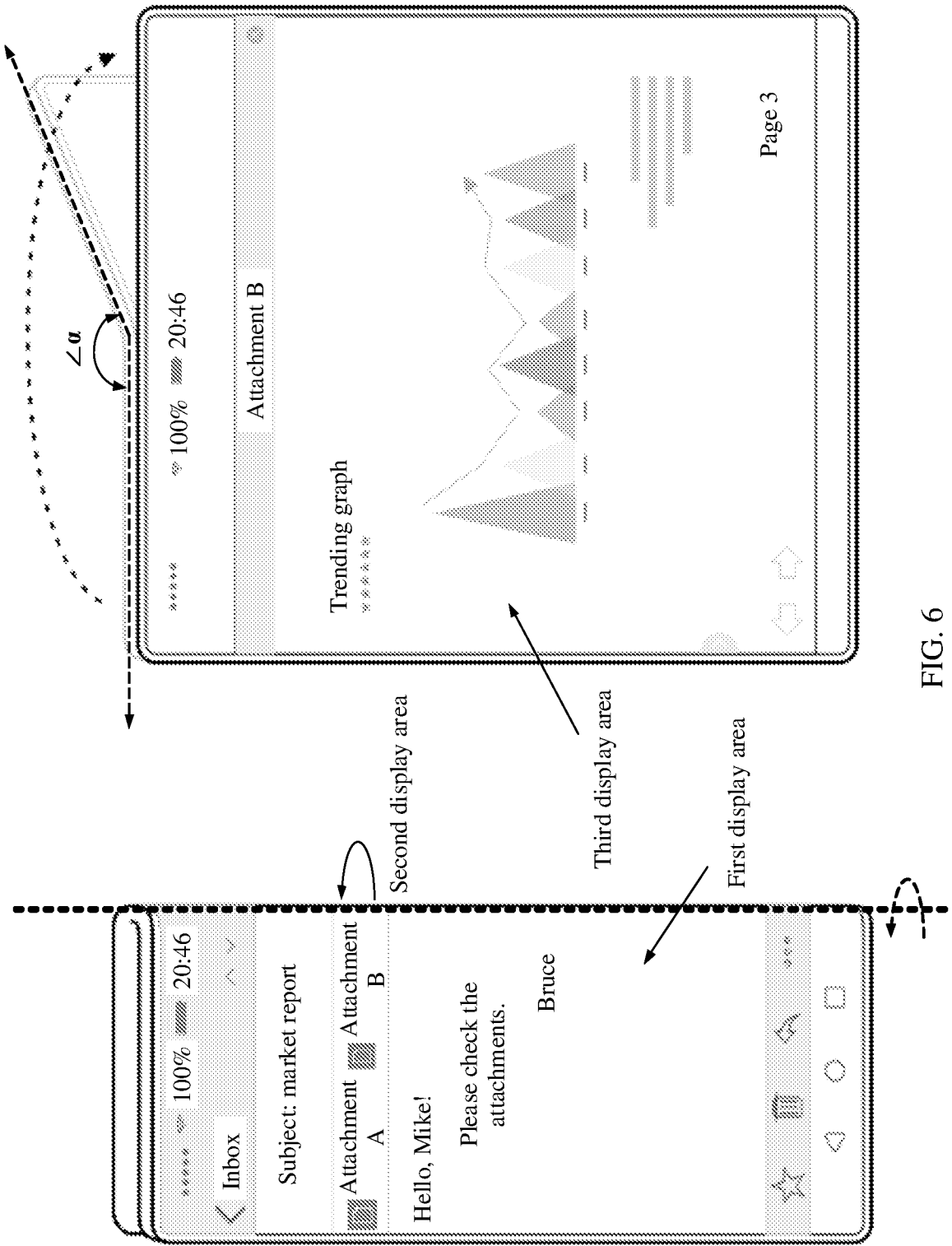
FIG. 6 is a schematic structural diagram existing when an embodiment of a display method according to this application is applied to an electronic device.

Specifically, FIG. 6 is a schematic structural diagram of a display scenario existing when an embodiment of a display method according to this application is applied to an electronic device. As shown in FIG. 6, the content displayed in the first display area is an email in an inbox of an email application, and the email includes an attachment A and an attachment B. In this case, the electronic device determines, based on the content "the attachment B" displayed in the first display area, that a corresponding application that a user expects to open by unfolding a foldable screen is an application for viewing the attachment B. Therefore, the electronic device selects and displays the first target application in the third display area obtained by combining the first display area and the second display area, and can further open, in the first target application, the attachment B that the user needs to view.

Optionally, in the foregoing embodiments, when the first display area includes a plurality of controls that can determine content of the first target application, such as a location A and the location B that are included in FIG. 4 or the attachment A and the attachment B that are shown in FIG. 6, the electronic device may determine the first target application based on a control that ranks the last input or action in the first display area, to meet a newest requirement of the user.

Optionally, in the foregoing embodiments, immediately after the folding angle in S101 is greater than the preset threshold, the first target application is determined by using S102. Therefore, when the first target application is displayed in the second display area or the third display area in S103 and S203, the folding angle between the first display area and the second display area does not fully reach e.g., 180 degrees obtained when the foldable screen is unfolded, that is, before the foldable screen of the electronic device is fully unfolded, the first target application is displayed in the unfolded second display area or third display area. Alternatively, after determining the first target application, the electronic device displays the first target application in the second display area or the third display area after the foldable screen of the electronic device is fully unfolded and the folding angle between the first display area and the second display area is e.g., 180 degrees.

Optionally, the display method shown in FIG. 5 may be used as a parallel selection solution or an alternative solution of the display method shown in FIG. 1, and the electronic device selects one of the two display methods for use, or the electronic device may execute one of the display methods based on a setting instruction of the user.

Optionally, in the foregoing embodiments shown in FIG. 1 and FIG. 5, after S103, the method further includes: when the folding angle becomes less than the preset threshold, closing the first target application displayed in the second display area; and after S203, the method further includes: when the folding angle becomes less than the preset threshold, closing the first target application displayed in the third display area.

In conclusion, in the display methods provided in the foregoing embodiments of this application, when the screen of the electronic device with the foldable screen is unfolded, the first target application can be determined based on the content displayed in the first display area, and the first target application can be displayed in the unfolded second display area or third display area, so that after unfolding the foldable screen, the user does not need to manually select an application, but the electronic device directly displays, in the second display area or the third display area, an application that the user expects to open. This reduces complexity of a display method of the electronic device to which the foldable screen is applied, improves intelligence of the electronic device, and further improves user experience of unfolding the foldable screen and displaying an application by the user.

Optionally, in the foregoing embodiments shown in FIG. 1 and FIG. 5, for S102 and S202 of determining a first target application based on content displayed in the first display area, a possible implementation is: determining semantic information of a text in the content displayed in the first display area, and determining that an application corresponding to the semantic information is the first target application.

Figure 7A:
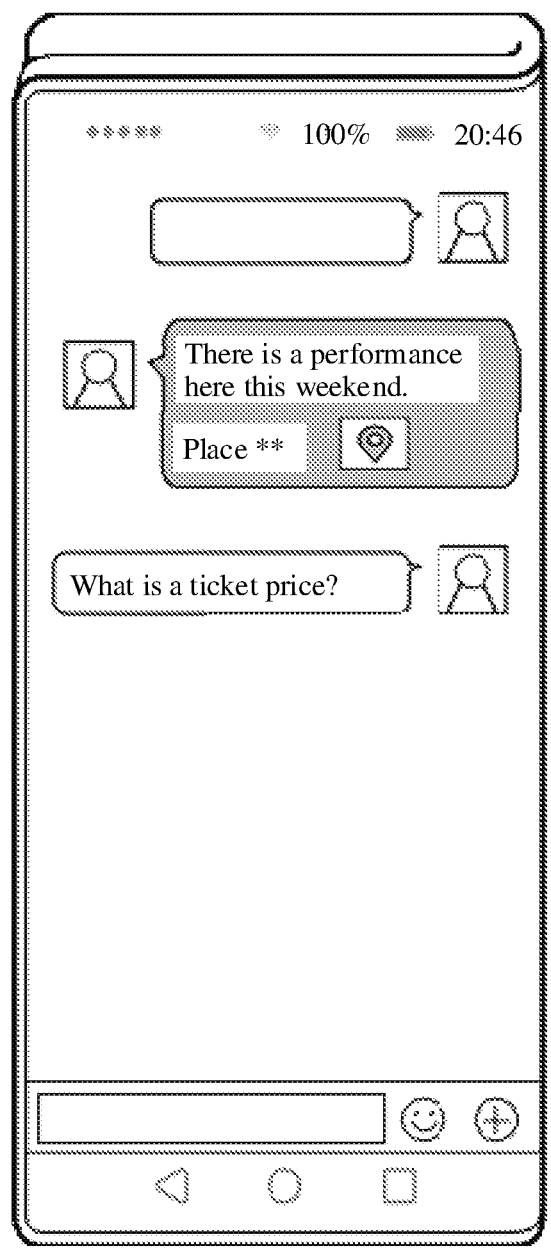
FIG. 7A and FIG. 7B are a schematic structural diagram existing when an embodiment of a display method according to this application is applied to an electronic device.
Figure 7B:
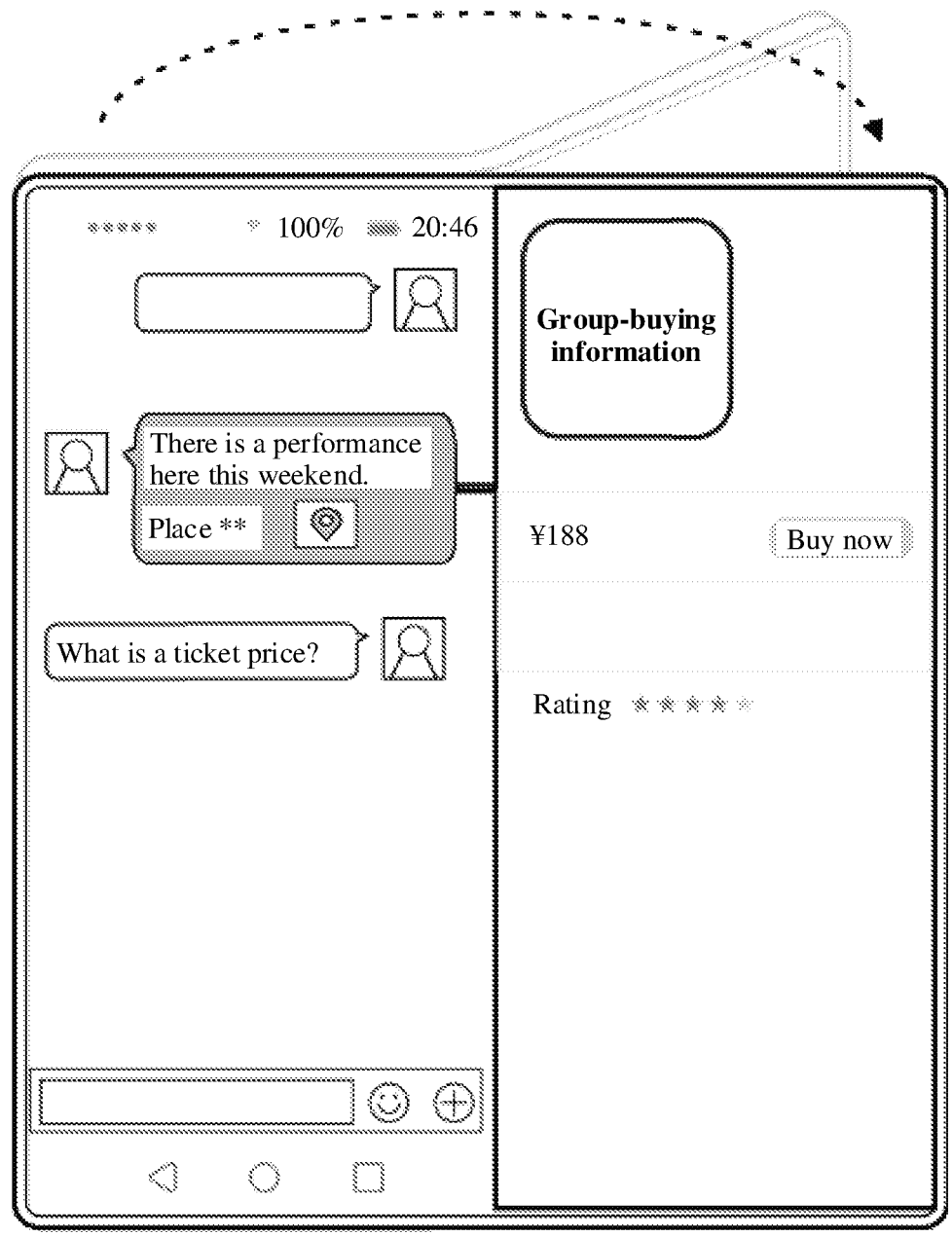

Specifically, FIG. 7A and FIG. 7B are a schematic structural diagram of a display scenario existing when an embodiment of a display method according to this application is applied to an electronic device. As shown in FIG. 7A and FIG. 7B, the content displayed in the first display area is dialog data in a communications application, texts of the dialog data are "there is a performance here this weekend, and a place is " and "what is a ticket price?", and semantic information of the texts are determined through semantic recognition. The semantic information determined based on the foregoing texts is that the user of the electronic device expects to learn of the ticket price of the performance. In this case, for example, the electronic device may learn, through the Internet, that the performance may be obtained through group buying in the first target application, display group-buying information in the first target application in the second display area after the user unfolds the foldable screen, for example, 188 yuan (currency amount), and prompt the user to immediately buy a ticket in the second display area. In this case, a dialog made in the communication application in the first display area and the data displayed in the first display area are not adjusted and changed. After the group-buying information in the first target application is displayed in the second display area, the dialog may be further continued in the communications application in the first display area, for example, a peer may be notified that a group-buying price is 188 yuan (currency amount). In addition, in the embodiments shown in FIG. 4 and FIG. 6**, the embodiments of determining, based on the location information in the session data in the communications application, to open the map application, and determining, based on the content of the attachment in the mail application, to open the application for reading the attachment may also be understood as determining the first target application based on the semantic information of the text in the first display area. A specific method for determining the semantic information of the text is not specifically limited in this embodiment, and a conventional method in a machine learning field may be used for implementation.

Optionally, in the foregoing embodiments shown in FIG. 1 and FIG. 5, for S102 and S202 of determining a first target application based on content displayed in the first display area, another possible implementation is: determining a location, of a focus of sight or gaze of a user of the electronic device, in the first display area, and determining the first target application based on content displayed at the location of the focus.

Figure 8A:
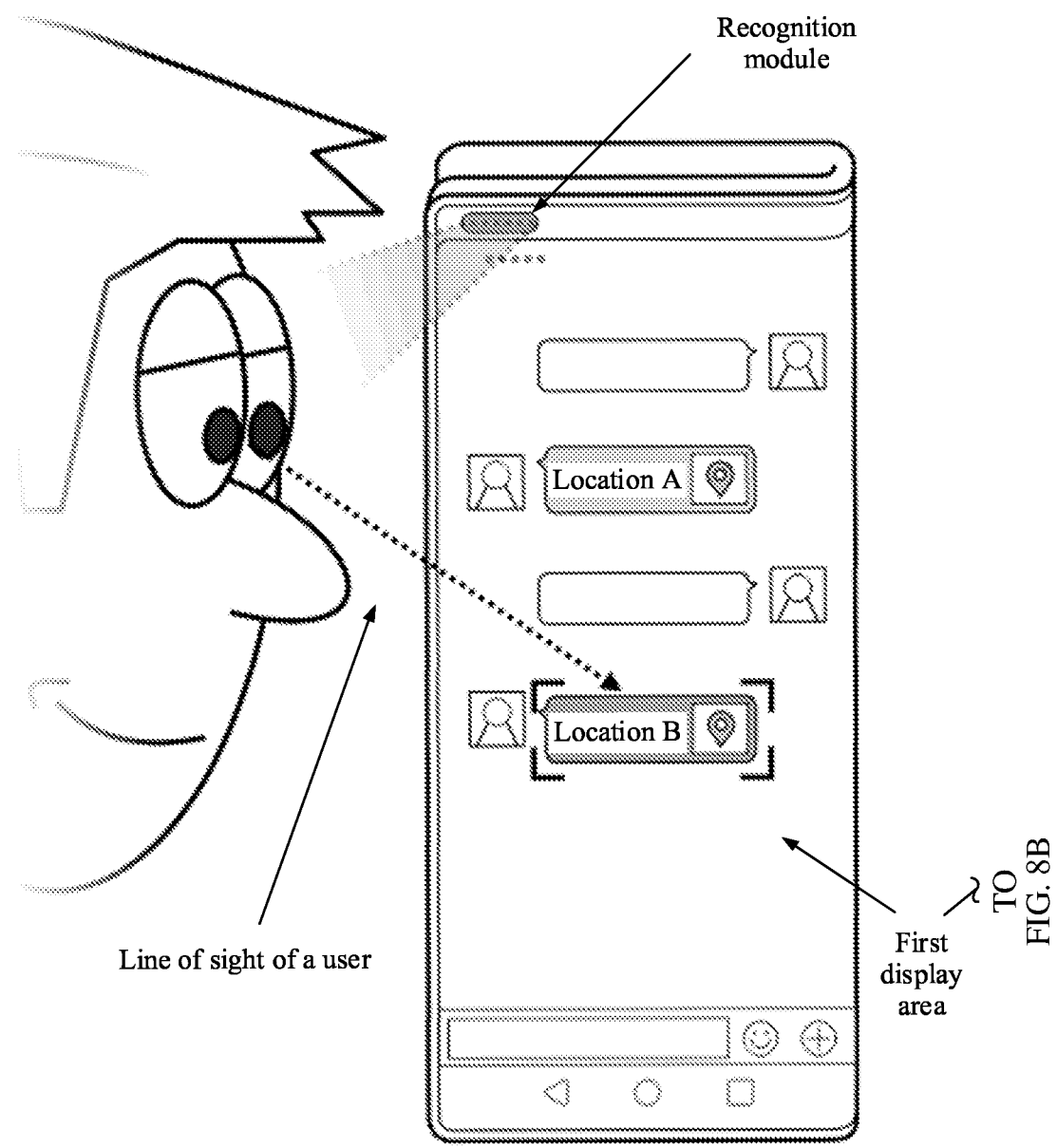
FIG. 8A and FIG. 8B are a schematic structural diagram existing when an embodiment of a display method according to this application is applied to an electronic device.
Figure 8B:
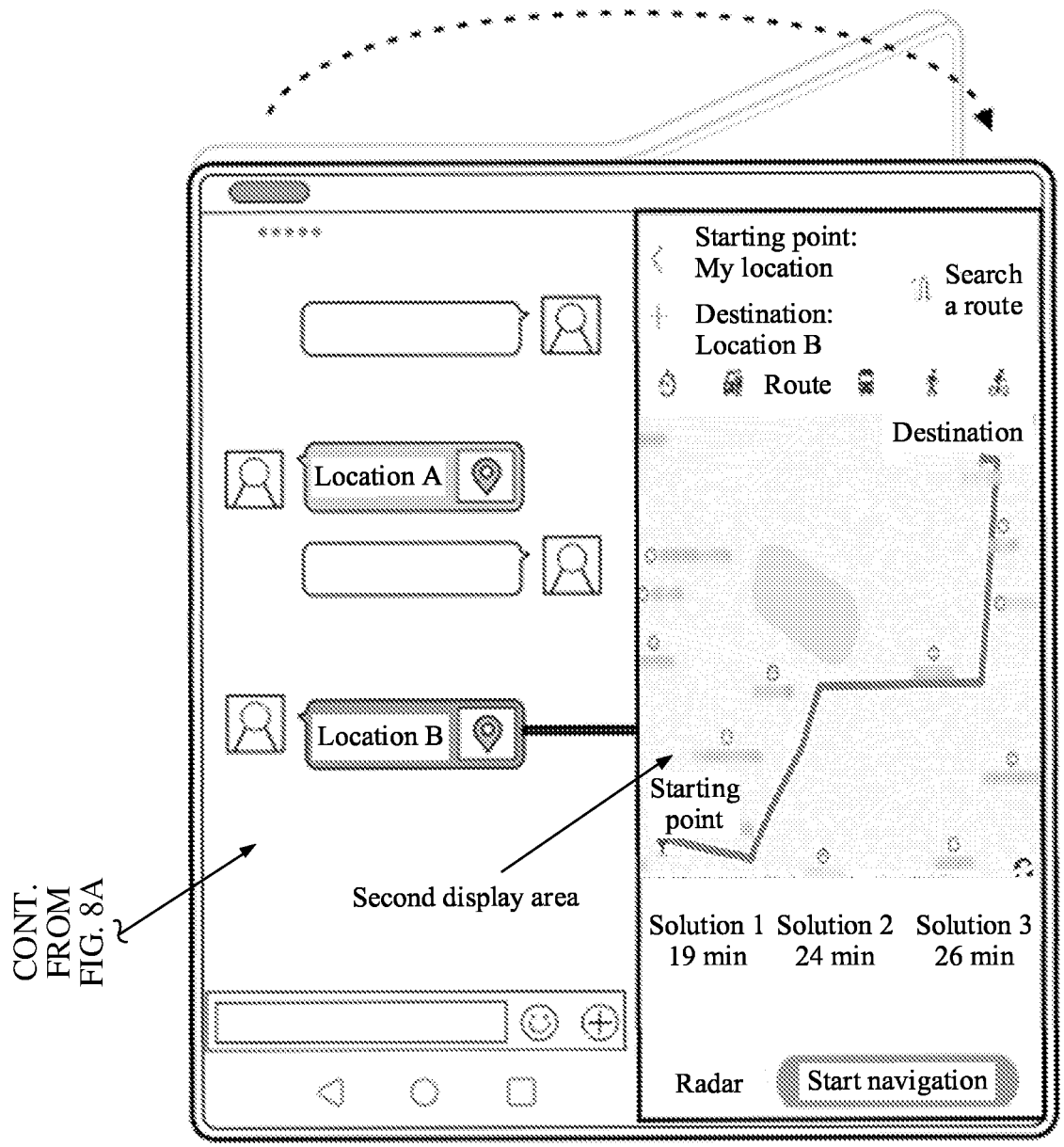
Figure 9A:
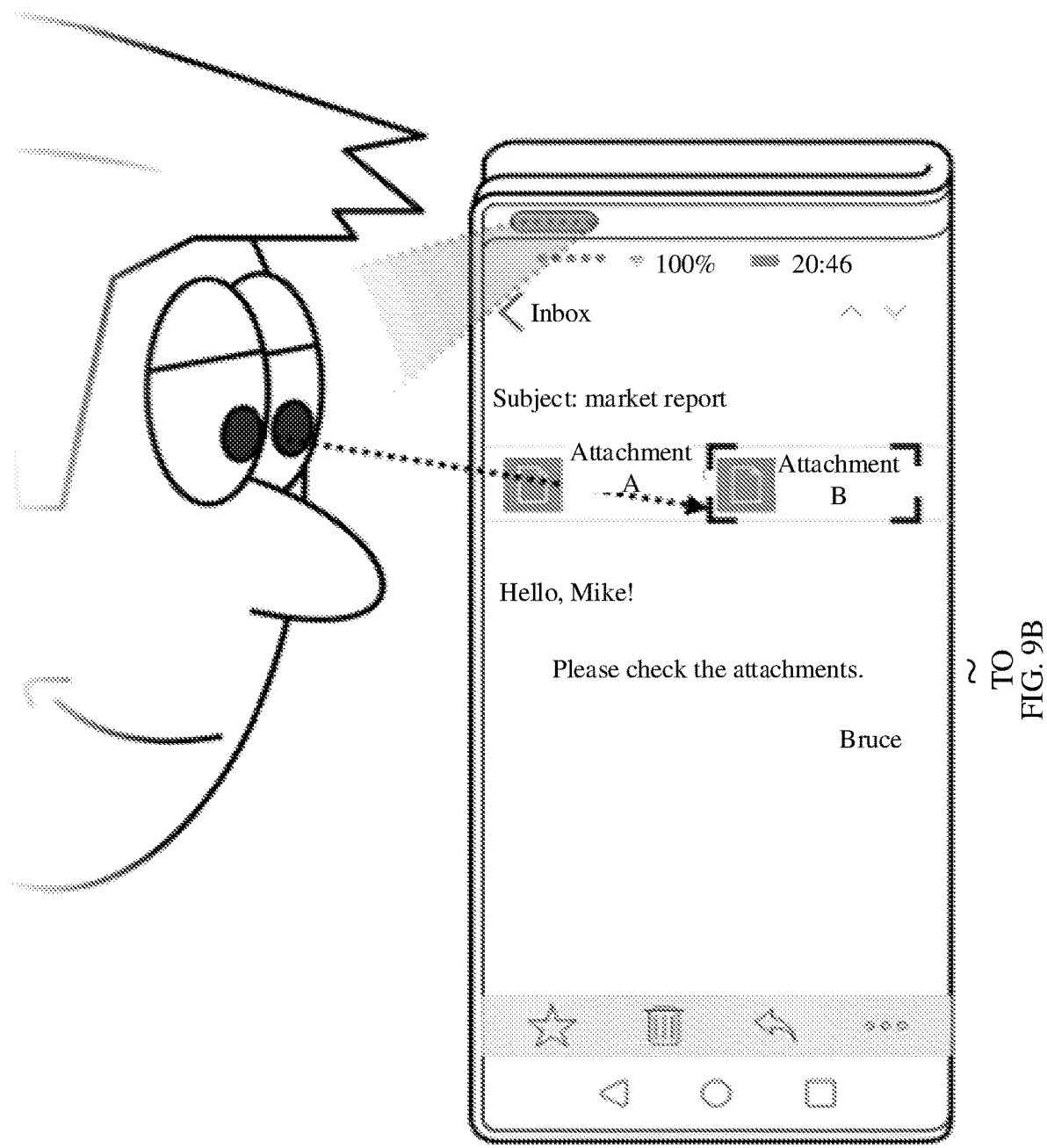
FIG. 9A and FIG. 9B are a schematic structural diagram existing when an embodiment of a display method according to this application is applied to an electronic device.
Figure 9B:
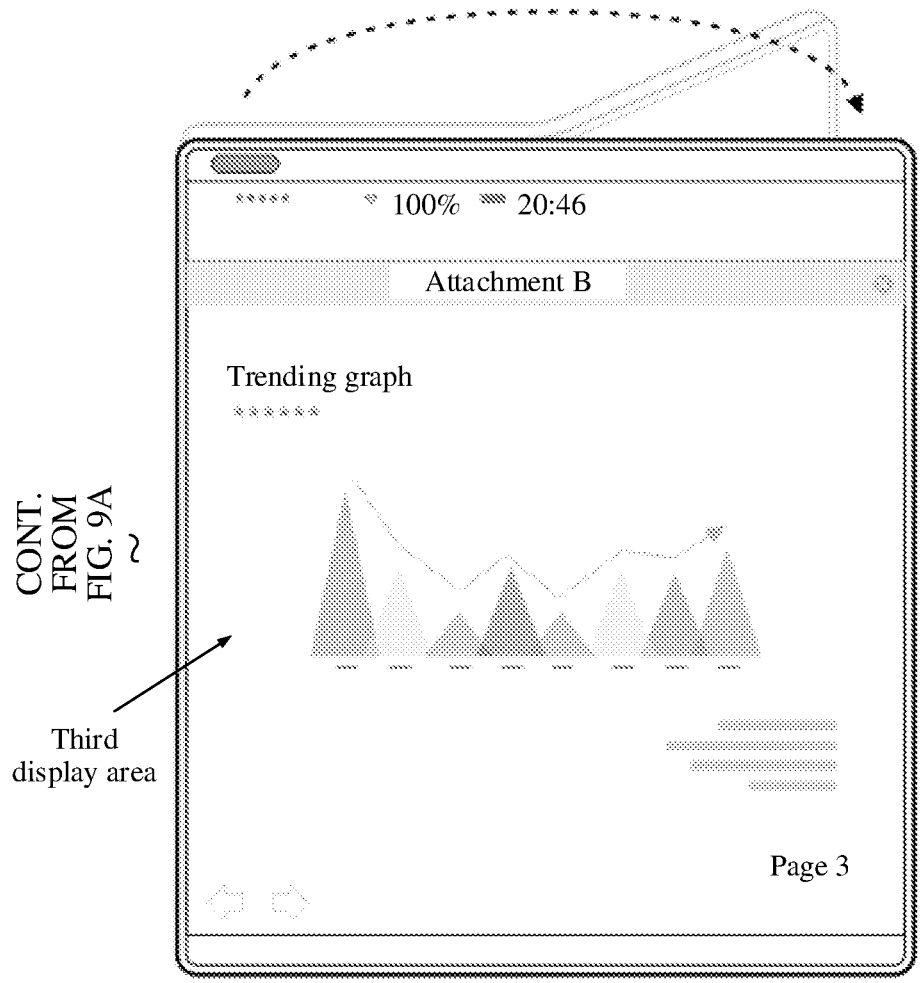

Specifically, FIG. 8A and FIG. 8B are a schematic structural diagram existing when an embodiment of a display method according to this application is applied to an electronic device. FIG. 9A and FIG. 9B are a schematic structural diagram existing when an embodiment of a display method according to this application is applied to an electronic device. FIG. 8A and FIG. 8B are a schematic structural diagram of determining, by using sight of a user (i.e., the direction of the user's gaze), a first target application to be displayed in a second display area. Eye expression or gaze of the user may be recognized by using a recognition module, sensor or device, and the focus of the sight or gaze of the user in the first display area may be determined by using the eye expression of the user. The focus is a location at which the user looks or gazes on currently. It may also be understood as follows: The user unfolds the foldable screen currently to expect to open the first target program corresponding to the content at the focus. In this case, as shown in FIG. 8A and FIG. 8B, when the recognition module, sensor or device of the electronic device recognizes that the location of the focus of the sight or gaze of the user in the first display area is the session data "the location B" in the communications application, it is determined that the user unfolds the foldable screen to expect to view related content of the location B by using the map application. In this case, the electronic device displays the determined map application in the second display area. A specific display manner is the same as that in the foregoing embodiment. Details are not described again in this embodiment. FIG. 9A and FIG. 9B are a schematic structural diagram of determining, by using the detected sight or gaze of a user, a first target application to be displayed in a third display area. Based on the same implementation method and principle as in the embodiment shown in FIG. 8A and FIG. 8B, after the first target program is determined, the determined first target program is displayed in the third display area.

Figure 10:
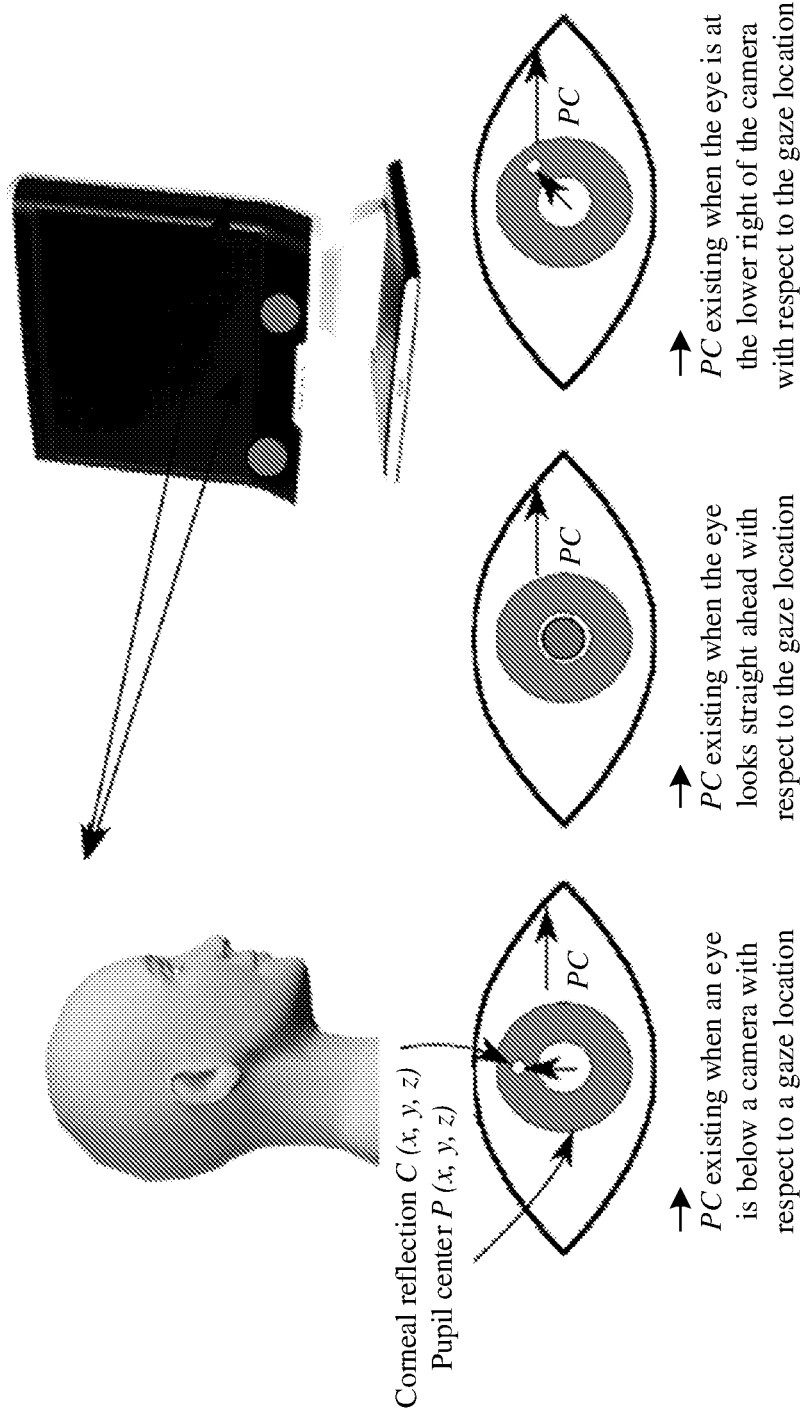
FIG. 10 is a schematic diagram of a principle of a method for determining sight of a user in a display method according to this application.

Optionally, FIG. 10 is a schematic diagram of a principle of a method for determining or recognizing the sight or gaze of a user in a display method according to this application. FIG. 10 shows a manner of recognizing eye expression of a user by using an infrared camera sensor of an electronic device. The infrared camera may be the recognition module, sensor or device in the foregoing embodiment. FIG. 10 shows a basic principle of a "pupil center-corneal reflection vector method". A near infrared light source is emitted by using the infrared camera, and a pupil and an iris of a person are easily recognized through irradiation of the infrared light source. It is assumed that a center location of the recognized pupil of the user is P (x,y,z), and a reflection point location, namely, a corneal reflection location, of the infrared light source on a cornea is C (x,y,z). In this case, a pupil center-corneal reflection vector may be recognized as $\overrightarrow{PC}$=P−C, and points obtained when the pupil center-corneal reflection vector varies with a direction of a point of gaze of a human eye are determined by using a spatial three-dimensional eyeball model for one-to-one matching and calibration, to obtain a calibration coefficient matrix M. Finally, the point of gaze of an eyeball is determined through the following function mapping: $f(PC_i)=G_i$, where $f(x_i, y_i, t_i)=(x_i, y_i, t_i)^T \cdot M \cdot (X_i, y_i, t_i)=(x_i', y_i', t_i)$. The manner that is of determining the sight or gaze of the user and that is provided in this embodiment is only an example. For details that are not listed, refer to a well-known method in the art. It should be noted that the example sets no specific limitation on the foregoing embodiment, and the sight or gaze of the user may be further recognized in another manner.

In conclusion, in the display method provided in this embodiment, the electronic device determines the location of the focus of the sight or gaze of the user in the first display area, to determine that an application corresponding to the content at the location of the focus is the first target program, and this method may be applied to the foregoing embodiments to display the determined first target program in the second display area or the third display area. This not only improves intelligence of the display method, but also improves accuracy of determining the first target program, and further improves user experience.

Figure 11A:
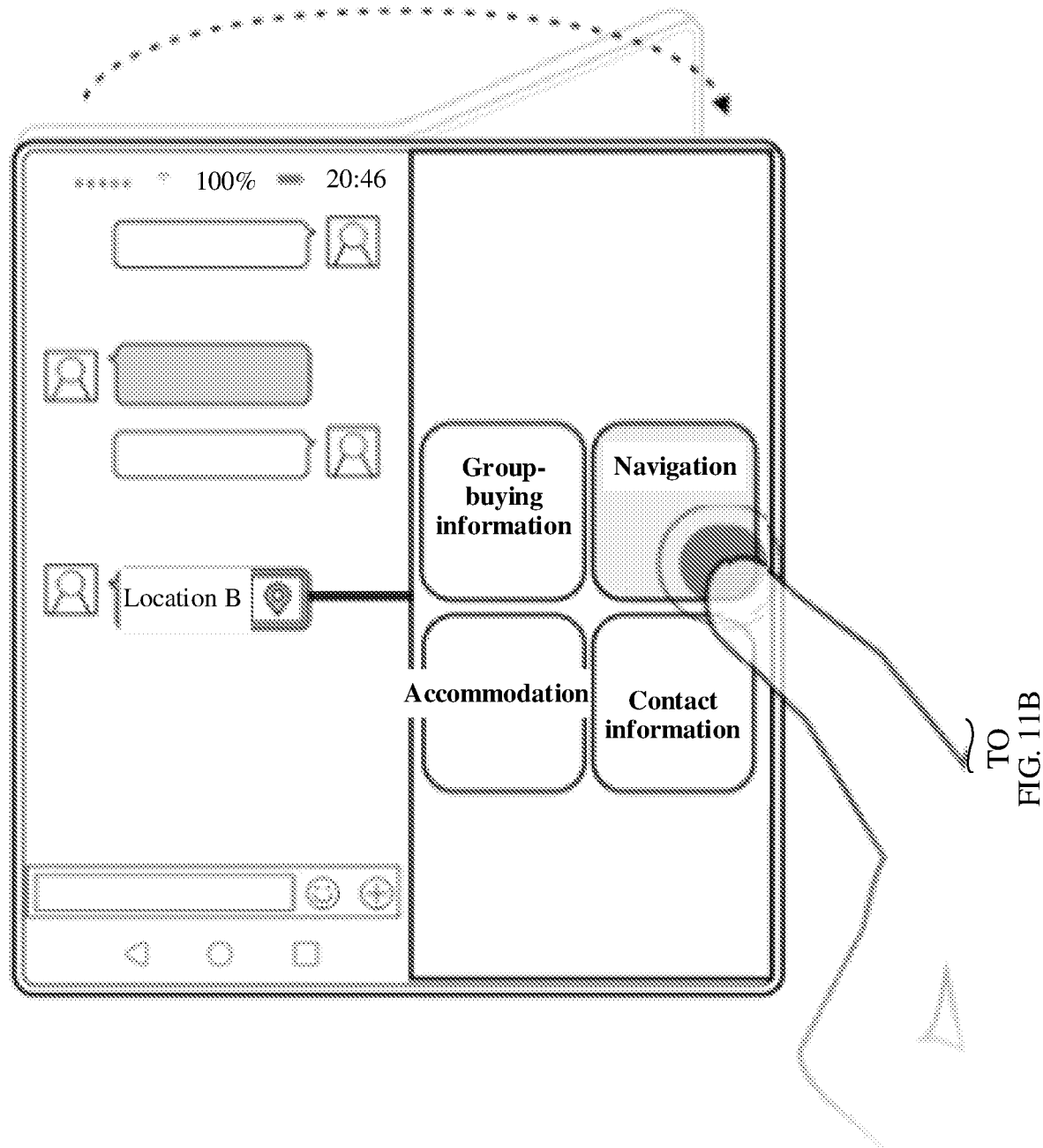
FIG. 11A and FIG. 11B are a schematic structural diagram existing when an embodiment of a display method according to this application is applied to an electronic device.
Figure 11B:
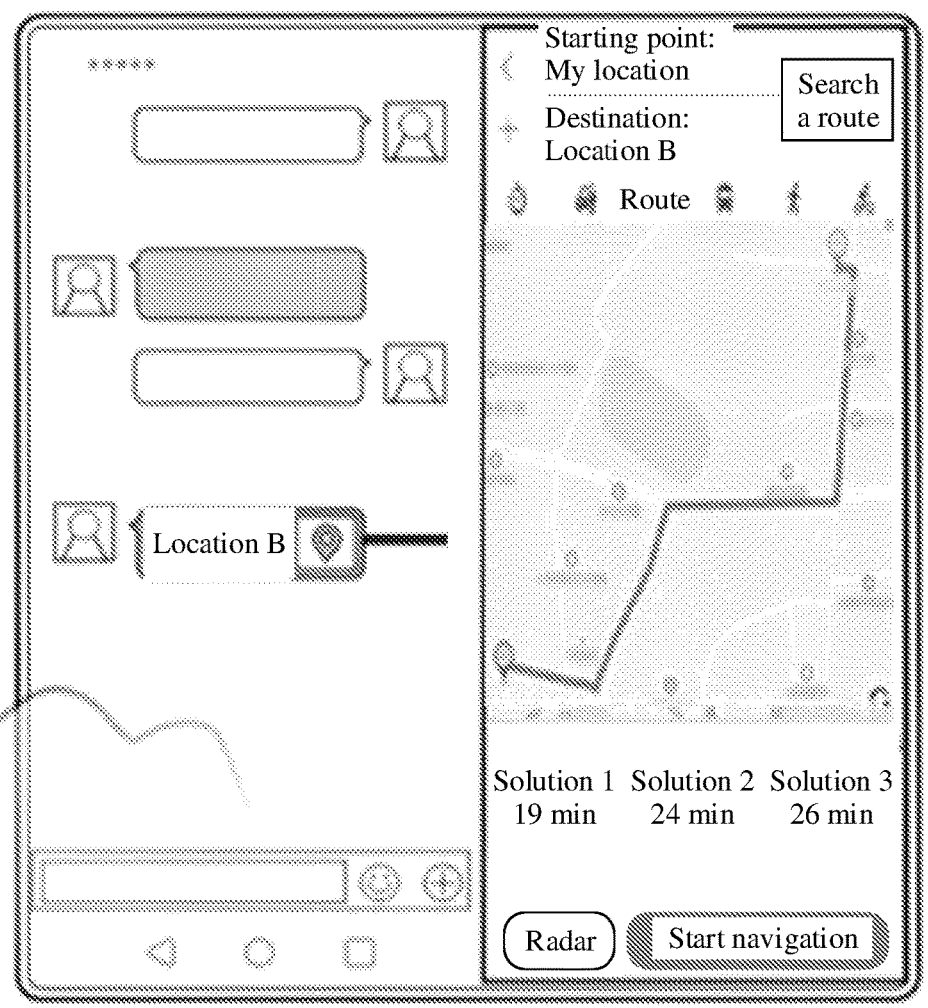

Optionally, FIG. 11A and FIG. 11B are a schematic structural diagram existing when an embodiment of a display method according to this application is applied to an electronic device. In the embodiment shown in FIG. 11A and FIG. 11B, based on the embodiments shown in FIG. 1 and FIG. 4, S103 specifically includes: displaying, in the second display area, N optional applications related to the first target application, where N≥2; obtaining a tapping action in the second display area, and determining that an optional application corresponding to a location of the tapping action is the first target application; and displaying the first target application in the second display area.

Specifically, as shown in FIG. 11A and FIG. 11B, when the electronic device determines, by using S101 and S102, that the location B is the content displayed in the first display area, and determines that the content is content that the user expects to view after unfolding the foldable screen. In this case, based on the "location B", a plurality of different optional applications may be further provided to the user for selection. For example, in FIG. 11A and FIG. 11B, the electronic device determines, based on the location B, that four example applications are respectively group-buying information, navigation, accommodation, and contact information, and displays representations such as thumbnails or icons of the foregoing four applications in the second display area in a form of a tappable control, so that the user can view and select an application by tapping or touching one of the displayed representations such as thumbnails or icons. After obtaining the tapping or touching action of the user in the second display area, the electronic device determines that a representation of one of the applications corresponding to the tapping or touching action, for example, the "navigation" map application corresponding to the navigation shown in the figure as being tapped or touched by the user's finger, is the first target application, and then displays the first target application in the second display area. Therefore, a user selection step is added before the first target application is displayed, and more possible solutions can be provided to meet a user requirement instead of just predicting a single application the user may wish to see and interact with in the second display area.

Figure 12:
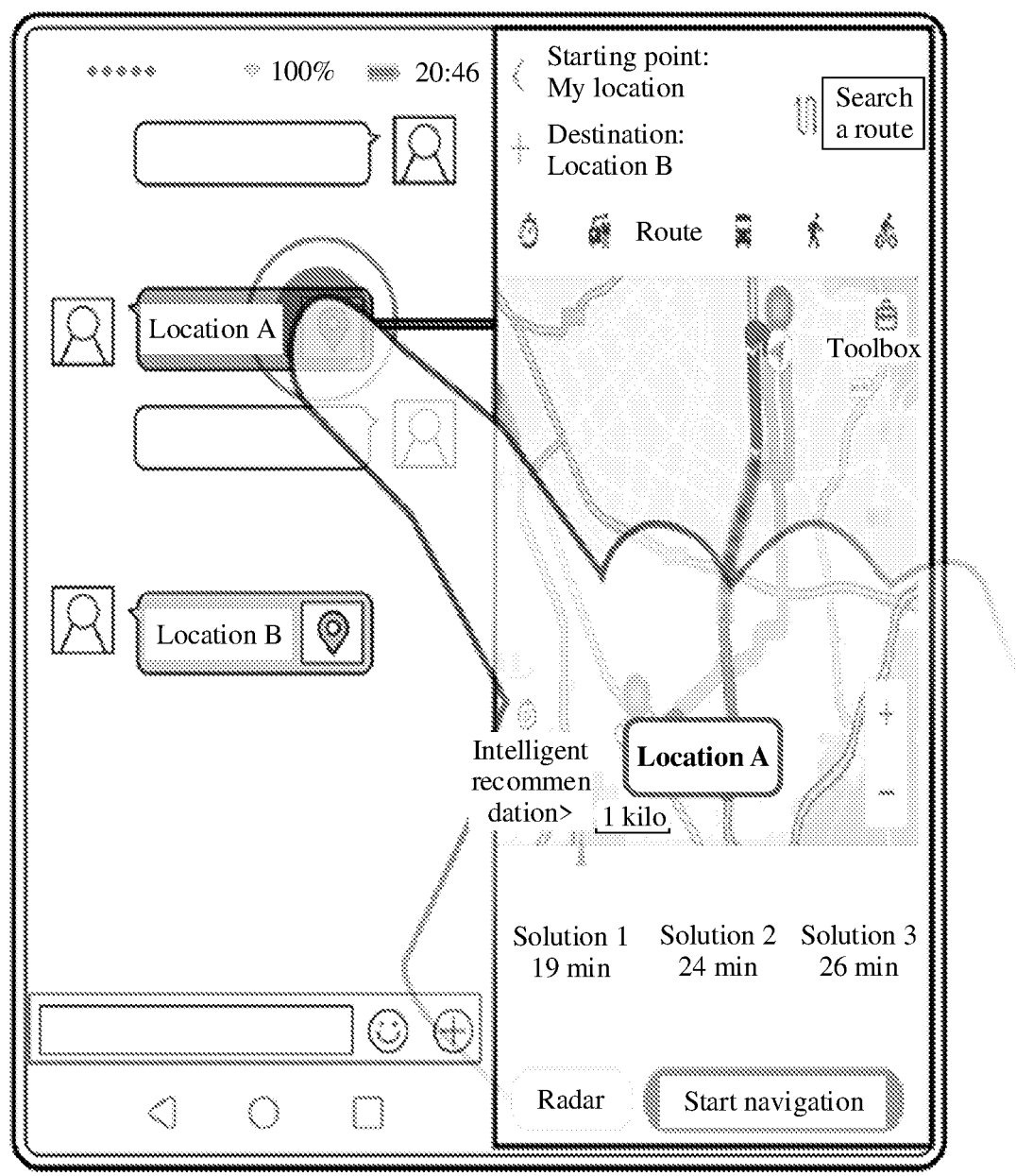
FIG. 12 is a schematic structural diagram existing when an embodiment of a display method according to this application is applied to an electronic device.

Optionally, FIG. 12 is a schematic structural diagram of a display scenario existing when an embodiment of a display method according to this application is applied to an electronic device. As shown in FIG. 12, based on the embodiments shown in FIG. 1 and FIG. 4, after the first target application is displayed in the second display area, a tapping action of the user in a display interface of the first display area may be further obtained, a second target application is determined based on content displayed at a location of the tapping action, and then the second target application is displayed in the second display area, to switch, based on selection of the user, a target application displayed in the second display area, or to switch, based on selection of the user, content displayed in a target application in the second display area. For example, in the embodiment shown in FIG. 12, the electronic device determines, based on the content "location B", that the first target application is the map application, and opens the map application in the second display area to display the location B. In this case, if the user taps the content "location A" in the first display area, after obtaining the tapping action of the user, the electronic device determines that the content corresponding to the tapping action is the "location A", and correspondingly, a target application is also the map application. In this case, the map application is displayed in the second display area, and the location A is displayed in the map application. That is, the first target application and the second target application herein may also be the same application.

Figure 13:
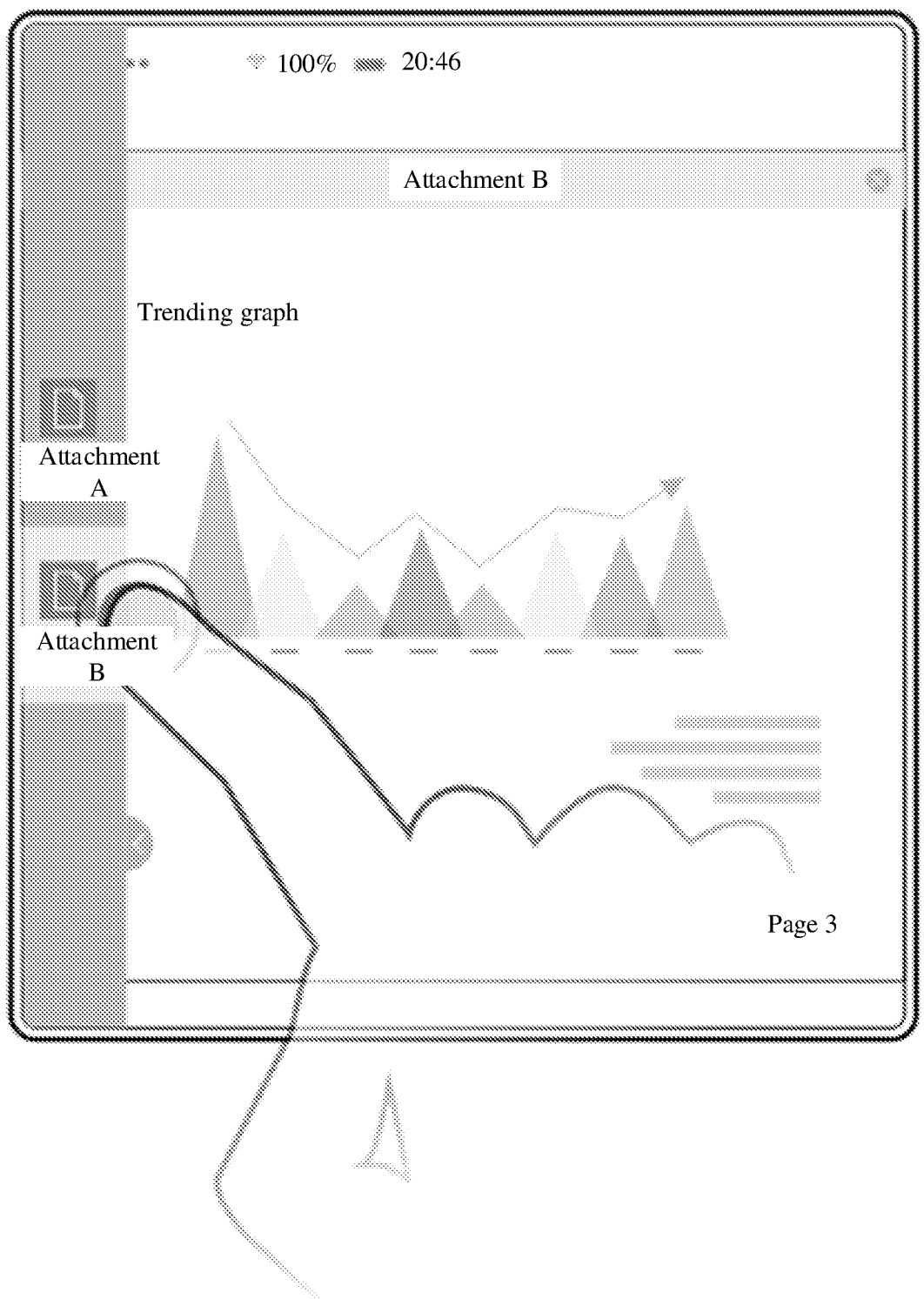
FIG. 13 is a schematic structural diagram existing when an embodiment of a display method according to this application is applied to an electronic device.

Optionally, FIG. 13 is a schematic structural diagram existing when an embodiment of a display method according to this application is applied to an electronic device. As shown in FIG. 13, based on the embodiments shown in FIG. 5 and FIG. 6, after the first target application is displayed in the third display area, a plurality of other optional applications may be further presented to the user, and after a tapping action of the user is obtained, the application displayed in the third display area is switched. After S203, the method specifically includes: displaying M optional applications in a specific area in the third display area, where M≥1, and the optional applications are related to the first target application, or the optional applications correspond to semantic information of a text in the content displayed in the first display area; obtaining a tapping action in the third display area, and determining that an optional application corresponding to a location of the tapping action is a third target application; and displaying the third target application in the third display area. For example, in FIG. 13, representations such as thumbnails or icons of two optional applications (e.g., "Attachment A" and "Attachment B") are displayed at an edge of the third display area. The optional applications are related to the first target application or are related to the content for determining the first target application in S202. In this case, after obtaining the tapping action of the user, the electronic device determines the third target application corresponding to content corresponding to the tapping action, and displays the determined third target application in the third display area. Optionally, the first target application and the third target application herein may also be the same application.

Further, optionally, in the foregoing embodiments shown in FIG. 1 and FIG. 5, before S101 and S102, the method further includes: obtaining a message prompt that is of the first target application and that is displayed in the first display area. S102 and S202 specifically include: determining the first target application based on the prompt message. Specifically, the message prompt in this embodiment may be a dialog box popped up in the first display area. For example, after receiving an SMS message, the electronic device pops up a dialog box in the first display area to prompt the user to view the SMS message. In this case, an SMS application is used as the first application. When the electronic device detects that the folding angle between the first display area and the second display area is greater than the preset threshold, the electronic device determines that the user unfolds or is unfolding the foldable screen to view content of the SMS message, determines, based on the SMS message prompt in the first display area, that the SMS application is the first target application, and subsequently displays the first target application (the SMS application) in the second display area or the third display area.

Figure 14:
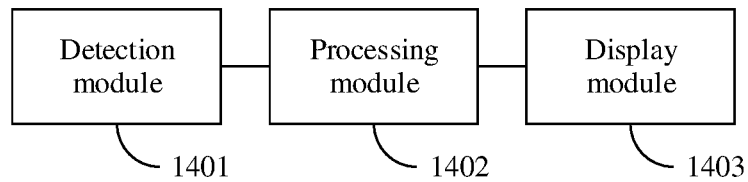
FIG. 14 is a schematic structural diagram of an embodiment of a display apparatus according to this application.

FIG. 14 is a schematic structural diagram of an embodiment of a display apparatus according to this application. As shown in FIG. 14, the display apparatus provided in this embodiment includes a detection module 1401, a processing module 1402, and a display module or processor 1403. The detection module 1401 is configured to detect a folding angle between a first display area and a second display area. The processing module 1402 is configured to: when the folding angle is greater than a preset threshold, determine a first target application based on content displayed in the first display area. The display module or processor 1403 is configured to cause the first target application to be displayed in the second display area.

Optionally, in the foregoing embodiment, the display module or processor 1403 is configured to display the first target program in a third display area obtained by combining the first display area and the second display area.

The display apparatus provided in this embodiment may be configured to execute the display method shown in FIG. 1 or FIG. 5. A specific implementation and a principle thereof are the same as those of the display method, and details are not described again.

Figure 15:
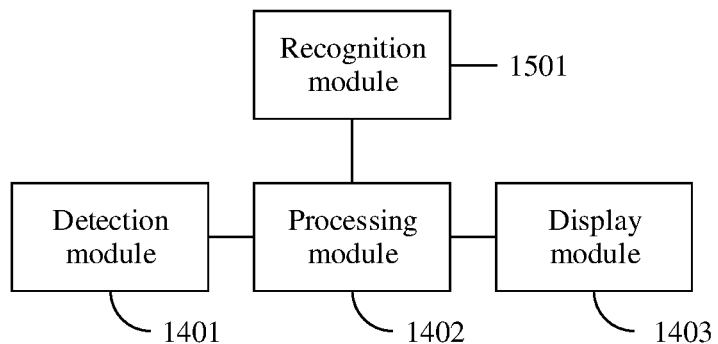
FIG. 15 is a schematic structural diagram of an embodiment of a display apparatus according to this application.

FIG. 15 is a schematic structural diagram of an embodiment of a display apparatus according to this application. Based on the display apparatus shown in FIG. 14, the display apparatus shown in FIG. 15 further includes a recognition module, sensor or device 1501. The recognition module, sensor or device 1501 is configured to determine a location, of a focus of sight or gaze of a user of the display apparatus, in the first display area. The processing module or processor 1402 is specifically configured to determine the first target application based on content displayed at the location of the focus.

The display apparatus provided in this embodiment may be configured to execute the display method shown in the foregoing embodiments. A specific implementation and a principle thereof are the same as those of the display method, and details are not described again.

Optionally, in the foregoing embodiment, the processing module or processor 1402 is specifically configured to: determine semantic information of a text in the content displayed in the first display area, and determine that an application corresponding to the semantic information is the first target application.

Optionally, in the foregoing embodiment, the display module or processor 1403 is further configured to cause display, in the second display area, of representations such as thumbnails or icons of N optional applications related to the first target application, where N≥2. The processing module or processor 1402 is further configured to: obtain a tapping or touch action in the second display area, and determine that an optional application corresponding to a location of the tapping or touch action is the first target application.

Optionally, in the foregoing embodiment, the processing module or processor 1402 is further configured to: obtain a tapping or touch action in a display interface of the first display area, and determine a second target application based on content displayed at a location of the tapping or touch action. The display module or processor 1403 is further configured to display the second target application in the second display area.

Optionally, in the foregoing embodiment, the display module or processor 1403 is specifically configured to: display M optional applications or icons or thumbnails thereof in a specific area in the third display area, where M≥1, and the optional applications are related to the first target application, or the optional applications correspond to semantic information of a text in the content displayed in the first display area. The processing module or processor 1402 is specifically configured to: obtain a tapping or touch action in the third display area, and determine that an optional application corresponding to a location of the tapping or touch action is a third target application.

Optionally, in the foregoing embodiment, the processing module or processor 1402 is further configured to: obtain a message prompt that is of the first target application and that is displayed in the first display area, and determine the first target application based on the prompt message.

The display apparatus provided in this embodiment may be configured to execute the display method shown in the foregoing embodiments. A specific implementation and a principle thereof are the same as those of the display method, and details are not described again.

It should be noted that, in the embodiments of this application, module division is exemplary, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium. Based on such an understanding, the technical solutions of this application or all or some of the technical solutions may be implemented in the form of a software product. The software product is stored in a non-transitory storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (Solid State Disk, SSD)), or the like.

Figure 16:
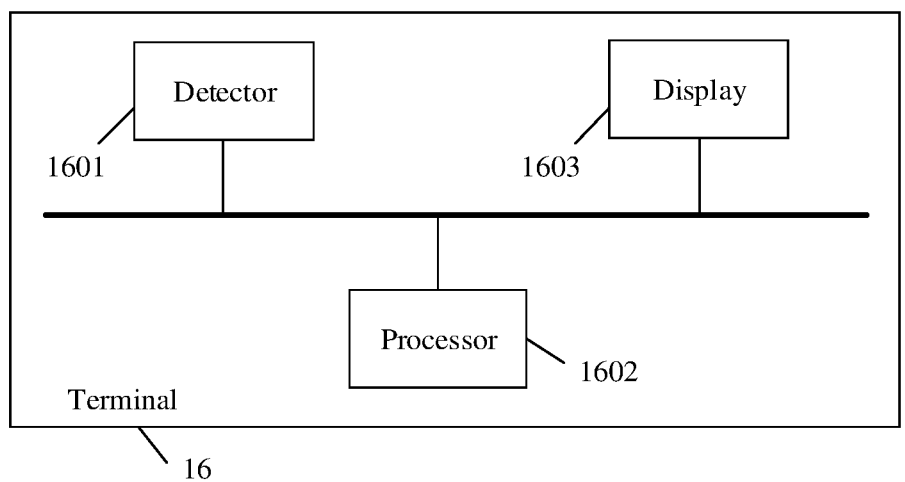
FIG. 16 is a schematic structural diagram of an embodiment of an electronic device according to this application.

FIG. 16 is a schematic structural diagram of an embodiment of an electronic device according to this application. As shown in FIG. 16, the electronic device includes a detector 1601, a processor 1602, and a display 1603. The detector 1601 is configured to detect a folding angle between a first display area and a second display area. The processor 1602 is configured to: when the folding angle is greater than a preset threshold, determine a first target application based on content displayed in the first display area. The display 1603 is configured to display the first target application in the second display area.

Optionally, in the foregoing embodiment, the display 1603 is configured to display the first target program in a third display area obtained by combining the first display area and the second display area.

The electronic device provided in this embodiment may be configured to execute the display method shown in FIG. 1 or FIG. 5. A specific implementation and a principle thereof are the same as those of the display method, and details are not described again.

Figure 17:
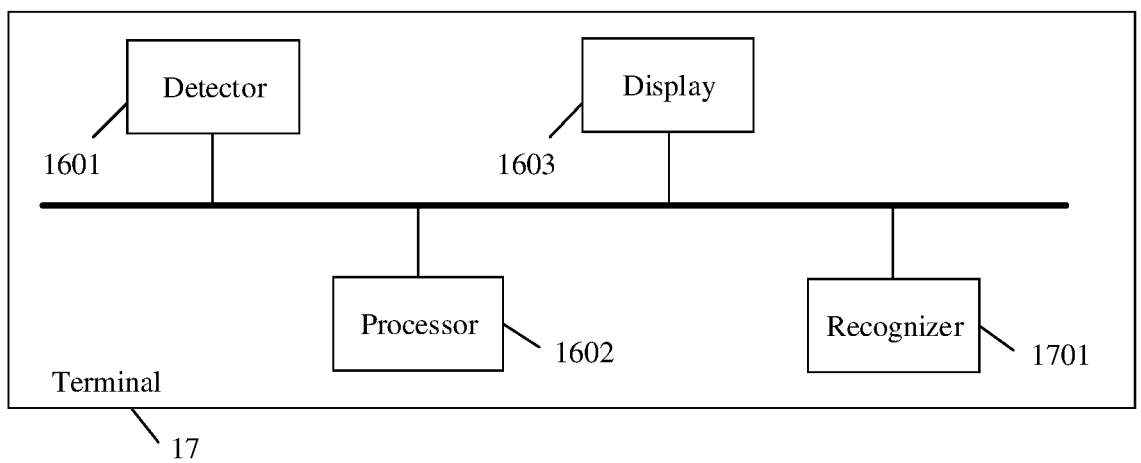
FIG. 17 is a schematic structural diagram of an embodiment of an electronic device according to this application.

FIG. 17 is a schematic structural diagram of an embodiment of an electronic device according to this application. Based on the electronic device shown in FIG. 16, the electronic device shown in FIG. 17 further includes a recognizer 1701. The recognizer 1701 is configured to determine a location, of a focus of sight or gaze of a user of the electronic device, in the first display area. The processor 1602 is specifically configured to determine the first target application based on content displayed at the location of the focus.

The electronic device provided in this embodiment may be configured to execute the display method shown in the foregoing embodiments. A specific implementation and a principle thereof are the same as those of the display method, and details are not described again.

Optionally, in the foregoing embodiment, the processor 1602 is specifically configured to: determine semantic information of a text in the content displayed in the first display area, and determine that an application corresponding to the semantic information is the first target application.

Optionally, in the foregoing embodiment, the display 1603 is further configured to display, in the second display area, N optional applications related to the first target application, where N≥2. The processor 1602 is further configured to: obtain a tapping action in the second display area, and determine that an optional application corresponding to a location of the tapping action is the first target application.

Optionally, in the foregoing embodiment, the processor 1602 is further configured to: obtain a tapping action in a display interface of the first display area, and determine a second target application based on content displayed at a location of the tapping action. The display 1603 is further configured to display the second target application in the second display area.

Optionally, in the foregoing embodiment, the display 1603 is specifically configured to: display M optional applications in a specific area in the third display area, where M≥1, and the optional applications are related to the first target application, or the optional applications correspond to semantic information of a text in the content displayed in the first display area. The processor 1602 is specifically configured to: obtain a tapping action in the third display area, and determine that an optional application corresponding to a location of the tapping action is a third target application.

Optionally, in the foregoing embodiment, the processor 1602 is further configured to: obtain a message prompt that is of the first target application and that is displayed in the first display area, and determine the first target application based on the prompt message.

The electronic device provided in this embodiment may be configured to execute the display method shown in the foregoing embodiments. A specific implementation and a principle thereof are the same as those of the display method, and details are not described again.

This application further provides an electronic device, including a processor and a memory, where the memory is configured to store a program, and the processor is configured to invoke the program stored in the memory to execute the display method in any one of the foregoing embodiments.

This application further provides a computer-readable storage medium, where the computer-readable storage medium stores program code, and when the program code is executed, the display method in any one of the foregoing embodiments is performed.

This application further provides a computer program product, and when program code included in the computer program product is executed by a processor, the display method in any one of the foregoing embodiments is implemented.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof. These modifications and replacements shall not cause the essence of the corresponding technical solutions to depart from the scope of the technical solutions of the embodiments of this application.

We claim:

1. A display method applied to an electronic device, comprising:
    displaying a first display interface comprising a display interface of a first application;
    detecting a first operation, wherein the first operation comprises unfolding the electronic device;
    in response to detecting the first operation, displaying a second display interface comprising a first display area and a second display area, wherein the first display area comprises the display interface of the first application and the second display area comprises at least two application icons, and wherein the at least two application icons are associated with a first content in the display interface of the first application;
    detecting a second operation acting on an application icon of the at least two application icons, wherein the application icon corresponds to a first target application;
    in response to detecting the second operation, displaying a third display interface that comprises the first display area and the second display area, wherein the first display area comprises the display interface of the first application and the second display area comprises a first interface of the first target application, and wherein the first interface of the first target application is associated with the first content;
    detecting a third operation acting on a second content in the display interface of the first application; and
    in response to detecting the third operation, displaying a fourth interface that comprises the first display area and the second display area, wherein the first display area comprises the display interface of the first application and the second display area comprises a second interface of the first target application, and wherein the second interface of the first target application is associated with both the first content and the second content.

2. The method of claim 1, wherein the electronic device has a foldable screen providing the first display area and the second display area, and the electronic device is in a folded state when the electronic device displays the first display interface.

3. The method of claim 1, wherein detecting the first operation comprises detecting an operation acting on the first display interface.

4. The method of claim 1, wherein detecting the first operation comprises detecting an operation acting on the first content of the first display interface.

5. The method of claim 1, wherein the second interface displayed in the second display area comprises the first content and the second content.

6. The method of claim 1, wherein the first content and the second content are the same type of content.

7. The method of claim 1, wherein the display interface of the first application is obtained by searching based on the first content.

8. An electronic device, comprising:
    a memory configured to store a program; and
    a processor configured to execute the program to enable the electronic device to perform operations comprising:

displaying a first display interface comprising a display interface of a first application;

detecting a first operation, wherein the first operation comprises unfolding the electronic device;

in response to detecting the first operation, displaying a second display interface comprising a first display area and a second display area, wherein the first display area comprises the display interface of the first application and the second display area of the second display interface comprises at least two application icons, and wherein the at least two application icons are associated with a first content in the display interface of the first application;

detecting a second operation acting on an application icon of the at least two application icons, wherein the application icon corresponds to a first target application;

in response to detecting the second operation, displaying a third display interface that comprises the first display area and the second display area, wherein the first display area comprises the display interface of the first application and the second display area comprises a first interface of the first target application, and wherein the first interface of the first target application is associated with the first content;

detecting a third operation acting on a second content in the display interface of the first application; and in response to detecting the third operation, displaying a fourth interface that comprises the first display area and the second display area, wherein the first display area comprises the display interface of the first application and the second display area comprises a second interface of the first target application, and wherein the second interface of the first target application is associated with both the first content and the second content.

9. The electronic device of claim 8, wherein the electronic device further comprises: a foldable screen providing the first display area and the second display area, the electronic device being in a folded state when the electronic device displays the first display interface.

10. The electronic device of claim 8, wherein the first operation comprises an operation acting on the first display interface.

11. The electronic device of claim 8, wherein the first operation comprises an operation acting on the first content of the first display interface.

12. The electronic device of claim 8, wherein the second interface displayed in the second display area comprises the first content and the second content.

13. The electronic device of claim 8, wherein the first content and the second content are the same type of content.

14. The electronic device of claim 8, wherein the display interface of the first application is obtained by searching based on the first content.

15. A non-transitory computer-readable storage media comprising instructions which, when executed by one or more processors of an electronic device, cause the one or more processors to perform operations comprising:

displaying a first display interface comprising a display interface of a first application;

detecting a first operation, wherein the first operation comprises unfolding the electronic device;

in response to detecting the first operation, displaying a second display interface comprising a first display area and a second display area, wherein the first display area comprises the display interface of the first application and the second display area comprises at least two application icons, and wherein the at least two application icons are associated with a first content in the display interface of the first application;

detecting a second operation acting on an application icon of the at least two application icons, wherein the application icon corresponds to a first target application;

in response to detecting the second operation, displaying a third display interface that comprises the first display area and the second display area, wherein the first display area comprises the display interface of the first application and the second display area comprises a first interface of the first target application, and wherein the first interface of the first target application is associated with the first content;

detecting a third operation acting on a second content in the display interface of the first application; and in response to detecting the third operation, displaying a fourth interface that comprises the first display area and the second display area, wherein the first display area comprises the display interface of the first application and the second display area comprises a second interface of the first target application, and wherein the second interface of the first target application is associated with both the first content and the second content.

16. The non-transitory computer-readable storage media of claim 15, wherein the display interface of the first application is obtained by searching based on the first content.

* * * * *